United States Patent
De Freitas

(10) Patent No.: US 6,652,179 B2
(45) Date of Patent: Nov. 25, 2003

(54) SEALING CAP FOR BALL JOINT ASSEMBLY

(75) Inventor: Ademilson Vlademir De Freitas, São Paulo (BR)

(73) Assignee: Dana Industrial S/A, Sao Paulo (BR)

( * ) Notice: Subject to any disclaimer, the term of this patent is extended or adjusted under 35 U.S.C. 154(b) by 0 days.

(21) Appl. No.: 09/916,651

(22) Filed: Jul. 30, 2001

(65) Prior Publication Data

US 2002/0028106 A1 Mar. 7, 2002

(30) Foreign Application Priority Data

Jul. 28, 2000 (BR) .............................. 0003450

(51) Int. Cl.⁷ ................................................ F16C 11/00
(52) U.S. Cl. ...................... 403/134; 277/635; 277/637
(58) Field of Search ................................ 403/122, 133, 403/134, 51; 464/173, 175; 277/634–637, 642

(56) References Cited

U.S. PATENT DOCUMENTS

| | | | | |
|---|---|---|---|---|
| 2,308,073 A | * | 1/1943 | Hagerty ...................... 464/175 |
| 3,204,427 A | * | 9/1965 | Dunn ...................... 464/175 X |
| 3,248,955 A | * | 5/1966 | Templeton .............. 403/134 X |
| 3,490,343 A | * | 1/1970 | Afanador et al. ......... 403/51 X |
| 3,910,588 A | * | 10/1975 | Austin ..................... 277/637 X |
| 4,154,546 A | * | 5/1979 | Merrick et al. ............. 403/134 |
| 4,493,676 A | * | 1/1985 | Krude .................... 464/175 X |
| 4,936,635 A | * | 6/1990 | Sakaguchi .............. 277/634 X |
| 5,100,254 A | * | 3/1992 | Wasada ...................... 403/134 |
| 5,538,275 A | * | 7/1996 | Lomnick ................ 277/635 X |
| 5,876,149 A | * | 3/1999 | Dorr et al. .................. 403/134 |

FOREIGN PATENT DOCUMENTS

| | | | | |
|---|---|---|---|---|
| DE | 29 42 005 A1 | * | 5/1981 | ................. 403/51 |
| GB | 1006462 | * | 10/1965 | ................. 403/134 |

* cited by examiner

*Primary Examiner*—Greg Binda
(74) *Attorney, Agent, or Firm*—Liniak, Berenato & White

(57) ABSTRACT

This invention refers to a sealing cap for a ball joint assembly comprising a ball rod having a ball member at its one end and an elongated shank member at its other end, a casing housing the ball member, and a sealing cap having a first end secured to the casing and a second end mounted about the shank member. The shank member is provided with an annular sealing seat receiving the second end of the sealing cap. The second end of the sealing cap is provided with a sealing bulge and a flexible sealing lip extending from said sealing edge, so that when the second end of the sealing cap is mounted over said sealing seat of said shank member, the sealing lip deforms and bends over towards the sealing edge, thus forming an enclosed channel therebetween.

6 Claims, 1 Drawing Sheet

SEALING CAP FOR BALL JOINT ASSEMBLY

BACKGROUND OF THE INVENTION

1. Field of the Invention

The present invention relates to ball joint assemblies, and more particularly to structure of a sealing cap in a ball joint assembly.

2. Description of the Prior Art

Spherical or ball joints intended for various industrial applications, such as steering and suspension systems of automotive vehicles, need a sealing system to prevent impurities, such as road dirt, sand and water, penetrate in its interior. Consequently, the presence of impurities between the frictioning parts of the ball joint assembly tends to cause a premature wear of its components and affects the operation of the ball joint assembly.

The ball joint assemblies are well known in the prior art. The typical ball joint assembly normally comprises a ball rod having a substantially spherical ball member at its one end and an elongated substantially cylindrical shank member at its other end. The ball member of the ball rod is coupled to a single or divided bearing and is housed within an interior of a ball joint casing. The ball joint casing has an opening through which the ball portion of the ball rod and the bearing are mounted within the ball joint casing. The ball member of the ball rod is sealed within the ball joint casing by a flexible sealing cap fixed to the casing so as to prevent the penetration of impurities into the interior of the joint casing.

Usually, the sealing cap is made of rubber, or any other similar elastic material. The sealing cap has two open ends. A first end having an opening of a bigger diameter is coupled to an external surface of the casing, and a second end having an opening of a smaller diameter is mounted about the shank member of the ball rod. The ends of the sealing cap are coupled to the casing and the shank member of the ball rod by means of corresponding straining rings, such as C-rings, pressing the ends of the sealing cap against the external surface of the casing and the shank member, respectively.

This way of coupling of the sealing cap to the shank member of the ball rod, however, has proven itself inefficient due to some undesirable effects, related to the angular movement of the ball rod in its maximum limits, and the fact that the damage the sealing cap may occur during the mounting of straining rings on the ends thereof.

SUMMARY OF THE INVENTION

The present invention provides a novel sealing cap for a ball joint assembly for use in a motor vehicle. The spherical joint assembly in accordance with the present invention comprises a ball rod having a ball member at its one end and an elongated shank member at its other end, a bearing receiving the head member of the ball rod, a casing housing the bearing, and a sealing cap having a first end secured to the casing by means of a straining ring, and a second end mounted about the shank member. The shank member of the ball rod is provided with an annular crown member and an annular flange member axially spaced from the crown member. The crown member and the flange member form an annular sealing seat receiving the second end of the sealing cap. The second end of the sealing cap is provided with a sealing bulge and a flexible sealing lip extending from said sealing edge, so that when the second end of the sealing cap is mounted over said sealing seat of said shank member, the sealing lip deforms and bends over towards the sealing edge.

Therefore, the sealing cap of the present invention substantially improves sealing of the ball joint assembly over the prior art, eliminates the second straining ring used for coupling the second end of the sealing cap to the shank member of the ball rod, provides more reliable sealing, and makes the process of assembling the ball joint assembly easier and less laborious.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
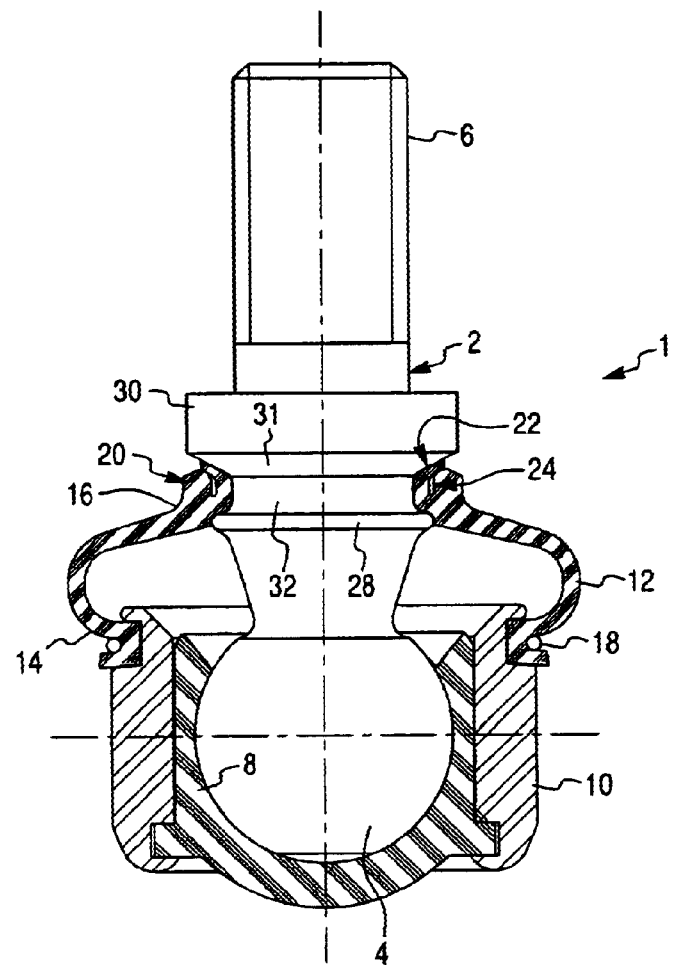
FIG. 1 is a cross-sectional view of a spherical joint assembly in accordance with the preferred embodiment of the present invention.

The FIG. 1 that shows the preferred embodiment of the invention, illustrates a spherical or ball joint assembly 1 comprising a ball rod 2 having a substantially spherical ball member 4 and an elongated generally cylindrical shank member 6 extending from the head member 4. The spherical head member 4 is received in a bearing 8, which, in turn, is housed in an interior cavity defined by a ball joint casing 10.

The shank member 6 of the ball rod 2 projects through an opening in one end of the casing 10. The shank member 6 of the ball rod 2 is fastened to a moving part (not shown) that needs angular and rotational movement relative to the ball joint casing 10. Thus, the angular and rotational movement provided between the ball rod 2 and the ball joint casing 10 must comply with the requirements of the moving parts that are connected thereto.

The ball joint assembly 1 further comprises a sealing cap 12 provided at the end of the casing 10 for preventing prevent impurities, such as road dirt, sand and water, from penetrating into the ball joint assembly 1. The sealing cap 12 has a first end 14 secured to the casing 10, and a second end 16 mounted about the shank member 6 of the ball rod 2. The sealing cap 12 is made of elastomeric material, such as rubber, polyurethane or soft-type synthetic resin.

The first end 14 of the sealing cap 12 is attached to an outer peripheral surface of the casing 10 by means of a straining ring 18 that firmly presses the end 14 of the sealing cap 12 against the outer peripheral surface of the casing 10.

The first end 14 of the sealing cap 12 has a generally cylindrical inner peripheral surface 15 that engages an outer peripheral surface of the casing 10 by means of a straining ring 18, engageable with groove 14', that firmly presses the inner surface 15 of the first end 14 of the sealing cap 12 against the outer peripheral surface of the casing 10, thereby effectively sealing the ball joint assembly 1.

The shank member 6 of the ball rod 2 is provided with an annular crown member 28 and an annular flange member 30 axially spaced from the crown member 28. The crown member 28 and the flange member 30 form an annular sealing seat 32 receiving the second end 16 of the sealing cap 12. Preferably, a front face 31 of the flange member 30, facing the crown member 28, has generally frusto-conical surface.

Figure 2:
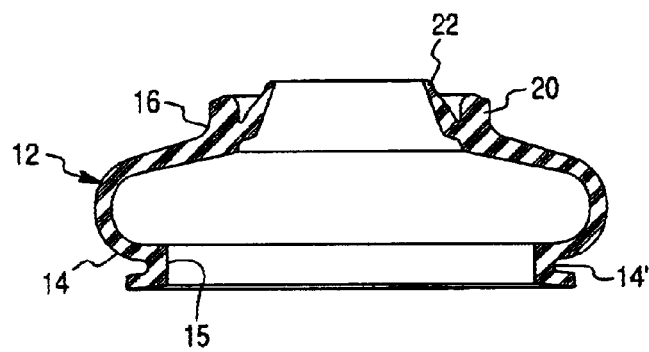
FIG. 2 is a cross-sectional view of a sealing cap in accordance with the preferred embodiment of the present invention.

The second end 16 of the sealing cap 12, as best seen in FIG. 2, is, in turn, provided with a sealing bulge 20 and a flexible sealing lip 22 extending from said sealing bulge 20, so that when the second end 16 of the sealing cap 12 is mounted over the sealing seat 32 of said shank member 6, the sealing lip 22 deforms and bends over toward the sealing bulge 20 forming an enclosed channel 24 therebetween.

Therefore, the sealing cap of the present invention substantially improves sealing of the ball joint assembly over the prior art, eliminates the second straining ring used for coupling the second end of the sealing cap to the shank member of the ball rod, provides more reliable sealing, and makes the process of assembling the ball joint assembly easier and less laborious.

The foregoing description of the preferred embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A ball joint assembly comprising:
    a ball rod having a substantially spherical ball member and an elongated shank member extending from said ball member;
    a casing defining an interior cavity for housing said ball member of said ball rod; and
    a sealing cap having a first end secured to said casing and a second end mounted about said shank member of said ball rod;
    said second end is provided with a sealing bulge and a sealing lip extending from said sealing bulge, said sealing lip is flexible relative to said sealing bulge, wherein said shank member is provided with a sealing seat receiving said second end of the sealing cap so that said sealing lip deforms and bends over said sealing bulge forming an enclosed channel therebetween.

2. The ball joint assembly as defined in claim 1, wherein said shank member of said ball rod has a crown member and a flange member axially spaced from the crown member, said crown member and said flange member form said sealing seat therebetween.

3. The ball joint assembly as defined in claim 2, wherein said flange member has a front face facing said crown member, said front face has a substantially frusto-conical surface.

4. A combination of a sealing cap and a ball joint assembly, said sealing cap comprising:
    a first end for securing to a casing of said ball joint assembly; and
    a second end for coupling to a pin member of said ball joint assembly,
    wherein said second end is provided with a sealing bulge and a sealing lip extending from said sealing bulge, said sealing lip is flexible relative to said sealing bulge, and
    wherein said ball joint assembly includes a ball rod having a substantially spherical ball member and an elongated shank member extending from said ball member, and a casing housing said ball member of said ball rod, said shank member is provided with a sealing seat receiving said second end of the sealing cap so that said sealing lip deforms and bends over said sealing bulge forming an enclosed channel therebetween.

5. The combination as defined in claim 4, wherein said shank member of said ball rod has a crown member and a flange member axially spaced from the crown member, said crown member and said flange member form said sealing seat therebetween.

6. The combination as defined in claim 5, wherein said flange member has a front face facing said crown member, said front face has a substantially frusto-conical surface.

* * * * *